(12) United States Patent
Mott et al.

(10) Patent No.: US 10,264,763 B2
(45) Date of Patent: Apr. 23, 2019

(54) PREDATOR DETERRENT VEST

(71) Applicants: Paul Mott, San Diego, CA (US); Pamela Mott, San Diego, CA (US)

(72) Inventors: Paul Mott, San Diego, CA (US); Pamela Mott, San Diego, CA (US)

(*) Notice: Subject to any disclaimer, the term of this patent is extended or adjusted under 35 U.S.C. 154(b) by 0 days.

(21) Appl. No.: 15/904,122

(22) Filed: Feb. 23, 2018

(65) Prior Publication Data
US 2018/0177155 A1 Jun. 28, 2018

Related U.S. Application Data (63) Continuation of application No. 14/981,291, filed on Dec. 28, 2015, now Pat. No. 9,901,074.

(51) Int. Cl.
*A01K 13/00* (2006.01)

(52) U.S. Cl.
CPC .................. *A01K 13/006* (2013.01)

(58) Field of Classification Search
CPC .. A01K 13/006; A01K 13/008; A01K 27/001; A01K 27/002; A01K 13/00; A41D 1/04; A41D 2600/108; A41D 13/0156; A41D 27/12
See application file for complete search history.

(56) References Cited

U.S. PATENT DOCUMENTS

| | | | | |
|---|---|---|---|---|
| 216,235 A | * | 6/1879 | Speer | A01K 13/006 119/855 |
| 2,744,348 A | * | 5/1956 | Smith | A01M 31/00 2/900 |
| 5,416,928 A | * | 5/1995 | Koenig | A41D 27/08 2/105 |
| 5,819,315 A | * | 10/1998 | Ruffa | A41D 13/0015 2/69 |
| 6,060,142 A | * | 5/2000 | Rossini | F41H 3/00 2/1 |
| 7,207,953 B1 | * | 4/2007 | Goicaj | A61H 23/02 601/134 |
| 7,653,948 B2 | * | 2/2010 | Schwenner | A61H 7/001 2/69 |
| 8,539,615 B1 | * | 9/2013 | Carver | A41D 13/0156 2/244 |
| 2011/0277703 A1 | * | 11/2011 | Yeaw | A01K 13/006 119/850 |

* cited by examiner

*Primary Examiner* — Kristen C Hayes
(74) *Attorney, Agent, or Firm* — Donn K. Harms

(57) ABSTRACT

A predator dissuading vest is provided for pets and other animals. The vest is configured to employ bristles extending from engagements with the vest to distal ends and spikes as a deterrent to an attack by a predator. Conductors for an electric shock can also be included as an additional predator dissuading component.

20 Claims, 5 Drawing Sheets

PREDATOR DETERRENT VEST

1. FIELD OF THE INVENTION

This application is a continuing application of U.S. patent application Ser. No. 14/981,291 filed on Dec. 28, 2015 which is incorporated herein in its entirety by this reference thereto.

The present invention relates generally to the protection of animals such as dogs and other domesticated animals from predator attacks. More particularly the invention relates to a wearable vest configured for the engagement of any of a plurality of predator deterring components to thereby prevent attacks upon the animal wearing the vest.

2. PRIOR ART

The human population, in industrialized countries, continues to be in need of new housing for ever larger populations. This expansion of housing has caused urban areas as well as small towns, to build homes further into previously unpopulated or sparely populated areas. This expansion of the human population into the areas around ever larger cities and towns, has caused an unintended consequence. Wild animals who previously lived in such unpopulated areas, are finding their living and hunting areas of land, encroached upon by humans and their new homes and housing tracts.

While many wild animals will avoid humans if at all possible, and will migrate away from expanding human populations, some wild animals have adapted to live or hunt in the housing areas within and surrounding cities and small towns. Coyotes and more recently in many states, bears and mountain lions and the like, have found that domestic animals which frequently accompany human homes and housing tracts, are an easy target for a meal. Other predatory animals such as raccoons and even wild boars, much like coyotes, have in recent years also sought out domesticated animals a food source.

Such predatory practices of wild animals surrounding and living within areas occupied by humans, have caused owners to seek protection for their pets and domesticated animals from such predator attacks. Many pet and animal owners have sought to keep predators at bay by constructing fences around their property. However, predators such as coyotes and mountain lions can easily traverse a six-foot tall fence or higher, and consequently the employment of fenced property has not been a significant success in dissuading attacks.

Additionally, predatory animals, in particular coyotes, have adapted well to urban life, and actually live in parks and areas surrounding rivers and lakes within the actual boundary of cities and towns. Further, coyotes living within urban areas as well as areas surrounding human populations, have become less afraid of humans, and modernly, found the pets and domesticated animals of the local human population to be a primary and easily taken food source. Indeed, daily news reports in the United States tell the story of pets such as dogs and cats being attacked by coyotes while the pet is being walked by their human owner. Such has resulted in the horrible outcome of a human pet owner visually witnessing the demise of their beloved pet companion. Additionally, many pets such as dogs and cats, and domesticated animals such as goats and sheep, go missing and are found, subsequently, to have been attacked by an urban predator such as a coyote or mountain lion or the like.

As such there exists an unmet need for a device which can be employed by human owners, to protect the health and welfare of their pets such as cats and dogs, and other domesticated animals which humans keep. Such a device should be easily engaged upon pets and animals by the owner, and be sufficiently light weight and comfortably worn so as to allow the pet or animal to move naturally. Such a device should dissuade attacks by rendering the pet or animal wearing it, larger, confusing, and hard to engage in the mouth of the predatory animal attempting an attack. Further, such a device should be configurable to not only confuse an attacker, but to render the pet or domestic animal as a non prey animal in the mind of the predator and avoid such attacks entirely.

The forgoing examples of related art in descaling predator attacks and limitations related therewith, are intended to be illustrative and not exclusive, and they do not imply any limitations on the invention described and claimed herein. Various other limitations of the related art are well known or will become apparent to those skilled in the art upon a reading and understanding of this specification and the accompanying drawings.

SUMMARY OF THE INVENTION

The device herein disclosed and described provides a solution to the shortcomings in prior art with regard to the protection of pets and domestic animals from predators such as wolves, mountain lions, and in particular due to their propensity to hunt in urban areas, coyotes. The device herein can be formed in a plurality of sequentially larger or smaller sizes, and configured in such sizes to be adaptable to engage upon a chosen pet or domesticated animal.

A primary component of the device herein, is a vest which is securable upon a pet or domesticated animal using a plurality of adjustable belts which may be adjusted in length to hold the vest on the pet or animal, with a portion covering the back and sides of the body of the animal, in a comfortable but secure fashion in an as-used positioning. The vest is configured in size to cover the back and sides and in particular the neck of the pet or animal to which it is engaged to this as-used position.

So engaged upon a pet or animal, the vest includes a number of fixed or user-configurable components. These components, in a simpler mode of the device, can be permanently engaged. However, in a preferred mode of the device allowing adaptation of the configuration, one or a plurality of different components may be engaged to an exterior surface of the vest to dissuade attacks and to confuse a predator viewing the pet or animal from a distance, as to whether the pet or animal is prey, foe, or something to be avoided. Such confusion or aversion will have the result of avoiding an attack all together.

Should a predator such as a coyote attack a pet or animal wearing the vest herein, the vest itself is configurable to protect the wearer from the engagement of the mouth of the predator with the body of the pet wearing the device. In one preferred mode of the device, the vest has side panels having bite-resistant material included therein such as ballistic nylon or Dacron or other materials employed in bullet resistant vests. At a minimum, the bite-resistant material should be included or positioned on the body of the vest such that the teeth of a predatory animal are unable to pierce the vest, and pierce the skin of the pet or animal wearing the vest. It has been found in experimentation that a predator such as a coyote, will attempt to grab a pet or domestic animal by the neck or on a side surface, by piercing the skin of the pet or animal during a bite. Without piercing of the skin by the teeth of the predator, it is unable to carry or shake a smaller pet or carry them off as they slip from the mouth of the predator if the teeth of the predator have not punctured the pet.

In addition to layered or ballistic resistant fabric positioned on the side panels and/or the neck area of the vest, another mode of the vest can include spikes projecting from the neck area, sides, or top, of the vest. With the vest in the as-used position engaged with a pet or animal, these spikes project radially around the neck of the wearer. Any attempt by a predator to grasp the neck of the vest-wearing animal between their jaws, will cause pain and even injury to the predator during closure of their mouth. The spikes may also be configured with fasteners configured to engage with the fasteners on the exterior surface of the vest. This allows for positioning of spikes on the top or side surfaces also. With the inclusion of radially projecting spikes of metal or a polymeric material capable or piercing the mouth of the predator, on the neck or sides or the vest, any predator attempting to bite the pet or animal wearing the vest will be painfully dissuaded from such.

While as noted above, any or all of the various dissuading components can be provided permanently engaged to the vest, in another particularly preferred mode of the device, removably engageable fasteners are positioned on the exterior surface of the vest, which are complimentary and adapted for removable engagement with one or a plurality of components or attachments to the exterior of the vest. Such fasteners can be snaps, clips, or any separable-fastener where one half of the fastener is positioned on the exterior surface of the vest in the as-used position, and will cooperatively engage with the other half of the fastener positioned on an attachment to the vest. Hook and loop fabric is a particular favored fastener and is available in hook, loop, or combination hook and loop fabric which will engage like fabric or, hook fabric, or loop fabric. Such can be engaged in elongated strips to the vest thereby allowing for engagement of one or a plurality of attachments to the vest anywhere along the strip.

In a particularly preferred mode of the device herein, bristles or thin elongated members can be provided preengaged, or are engageable to one or a plurality of positions upon the exterior of the vest. The bristles preferably extend between one-half to eighteen inches or more from an engagement end at a connection point to the vest, to a distal end of the bristle extending away from the connection point. The bristle attachments can be engaged in one or a plurality of locations on the exterior surface of the vest, wherever a mating fastener is positioned on the vest which is adapted to engage a bristle attachment.

The bristle attachments are particularly favored as the distal ends of the projecting bristles can cause extreme discomfort to a predator in that contact with the distal ends of the bristles the eyes and mouth of a predator attempting to bit the pet wearing the vest, will cause the predator pain in addition to confusion. Such contact being less than a pleasant sensation is a means to dissuade a predator attempting to bite the pet wearing the vest.

The bristles also are configured to elicit an avoidance reaction by the predator who will be confused by the projecting bristles, and in some cases significantly dissuaded from attaching should the predator have had previous experience with a porcupine. The bristles can be formed of stiff material such as polymeric material or plastic or could be formed of metal. They may be engaged to the back, sides, and neck of the vest having mating fasteners in such locations to engage the base of a bristle attachment.

In another mode of the device herein, an electric shock can be delivered to any predator who has been able to grasp the pet or animal wearing the vest, within their mouth. This is a particular problem with small dogs and cats where despite the vest preventing puncturing by the teeth of the predator of the pet, the predator has grasped the pet, or started to carry the pet off to a remote location. In this mode, conductive fabric is provided which has fasteners thereon adapted to engage with the fasteners on the exterior of the vest. The two elongated sections of conductive fabric are each engaged to an electric shock device or stun gun device which communicates high voltage to each fabric section at low amperage. The shock device is connected to a battery power source engaged with the device, and in a current preferred mode has a wireless activation switch which will activate the device to communicate the high voltage power to the conducting fabric sections when a remote control is activated.

Alternatively, the control can also include a proximity communication between the remote control held by the user and the device, which will automatically arm the shock device to communicate and electric shock to an attacking animal if the dog or animal wearing the device herein, has strayed beyond a preset proximity. Such can be accomplished by having a control on the device worn by the dog, emit a signal periodically, which is answered by a signal from the remote control when received. However, if the dog has strayed beyond a proximity where a response is sent to an output signal, the control on the device would arm the shock device to communicate a shock should an attack occur and a bite connect both portions of conductive fabric.

Still further, the vest and control for arming the shock device may employ software adapted to receive a sound from an onboard microphone, and arm the shocking device, upon sensing a particular sound which may be pre-programed. The sound may be a sound emitted by the dog such as a squeal or other sound associated with panic or sensing an attack. Other modes of arming the shocking component may also be employed however currently the remote control, proximity sensor, and sound sensor are preferred modes.

Using the conductive material and high voltage stun component, if activated by the remote control, any predator having a pet or animal in their mouth which is in contact with the conductive strips, will receive a debilitating electric shock stunning the predator. Such will allow the pet owner to retrieve their pet while the predator recovers from the ordeal.

It should be noted that any of the described attachments above, can be employed alone, or in combination with any other of the attachments to the vest. Such will allow the user to configure the vest for their pet or animal in a fashion most likely to prevent harm to the pet based on the locale and the knowledge of the owner as to local predators.

With respect to the above description of the predator dissuading device and method herein, before explaining at least one preferred embodiment of the herein disclosed invention in detail, it is to be understood that the signaling invention is not limited in its application to the details of construction and to the arrangement of the components or steps noted in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device to automatically provide a wearable predatory dissuading vest for animals. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only. Such prepositions are not intended to be limiting or to imply that the device has to be used or positioned in any particular orientation.

Figure 1:
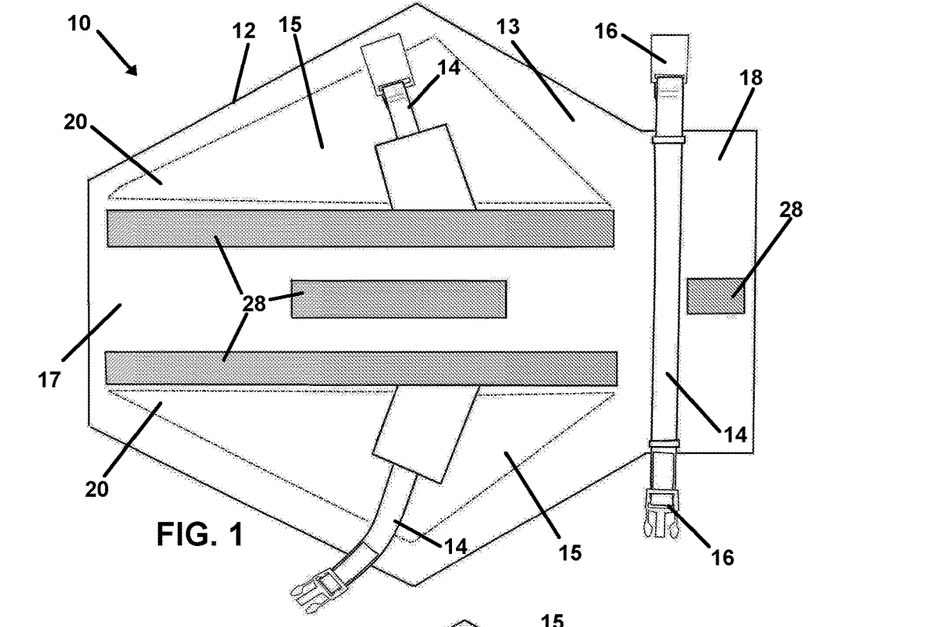
FIG. 1 shows an overhead or plan view of the exterior surface of the vest of the device herein, and shows the securing straps and shows the fasteners positioned on the exterior surface allowing for user configuration of the device.

Now referring to drawings in FIGS. 1-12, there is seen in FIG. 1 the device 10 FIG. 1 shows the overhead or plan view of an exterior surface of the vest 12 of the device 10 herein. The vest 12 employs a fastener adapted to maintain the vest 12 engaged over the back and down the sides of an animal such as a dog. Currently, such fasteners are provided by securing straps 14 having strap fasteners 16 at mating distal ends of the straps 14.

The body 13 of the vest 12 configured to the device 10 herein, so configured, is adapted to be secured to an as-used position, with the central portion substantially covering the back along the spine of an animal such as a dog, both opposing sides 15 or side portions, covering the sides of the body of the animal such as a dog. The vest 12 may be held in this as-used position, by securing the mating strap fasteners 16 on opposing sides of the body 13, to thereby hold the vest 12 in a manner substantially encircling the body of the animal being covered.

The body 13 of the vest 12 is formed of flexible fabric material, preferably a material which breathes such as textile fabric which is woven or knitted, or non woven. Such breathable allows the device 10 to fit comfortably in the as-used position. Bite-resistant portions 20 of the body 12 can be included in the vest 12 and can be formed of multiple layers of textile fabric forming the body of the vest 12, or may include ballistic or pierce-resistant fabric or material such as ballistic resistant material, such as KEVLAR, or other material which can be sewn, or positioned within a pocket, of the body of the vest 12.

Figure 2:
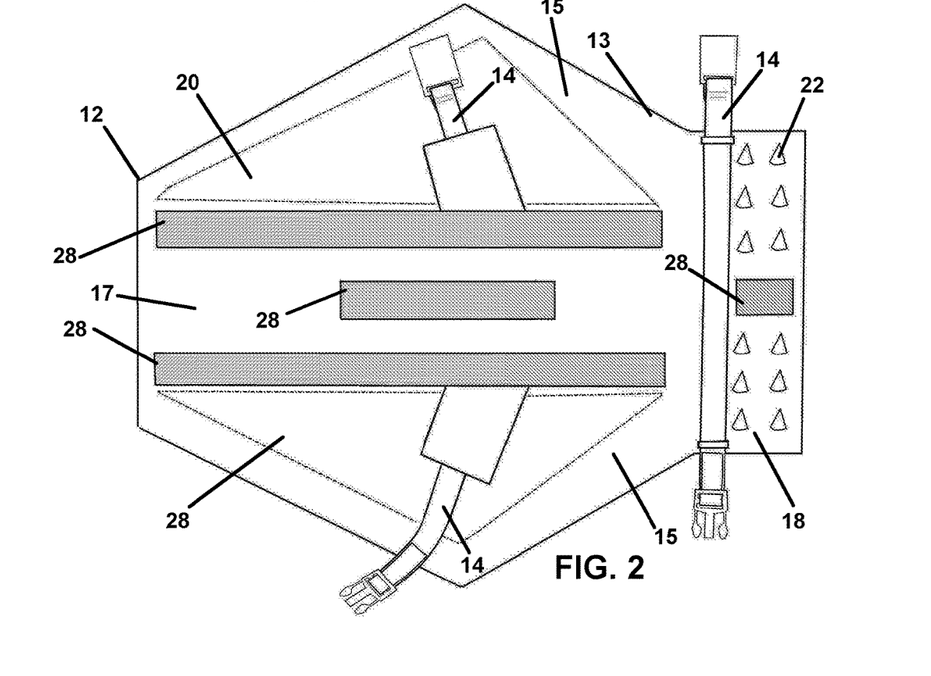
FIG. 2 depicts the device of FIG. 1, showing spikes engaged to a collar portion and also showing areas of the vest having bite resistance provided by multiple fabric layers and/or the inclusion of ballistic resistant fabric.

The bite resistant portions 20 can be placed anywhere on the vest 12, however experimentation has shown that panels of pierce resistant fabric positioned on opposing sides 15 of a central portion 17 of the vest covering the spine, which are configured to cover the sides of the body of the animal when in the as-used position, work well as shown in FIGS. 1 and 2.

The body 13 forming the vest 12 preferably includes a collar portion 18 at one end, adapted to encircle all or most of the neck of the animal having the device 10 positioned thereon in the as-used position. The collar portion 18 can also include a bite-resistant portion of similar construction to bite resistant portions 20 on the sides 15 of the body. So formed of pierce resistant fabric adapted to prevent the teeth of a predator from piercing the skin of the neck of the dog or animal wearing the device 10 around which the collar portion 18 wraps.

Such bite-resistant portions 20 can be included in addition to bite dissuading attachments shown engaged upon the collar portion 18, such as the pointed spikes 22 shown engaged to the collar portion 18 in FIG. 2. The spikes 22 can be permanently engaged to the body 13 of the vest 12 as in FIG. 2, or can be removably engaged to the vest 12 using a spike 23 strip shown in FIG. 5, and the removably engageable fasteners on an opposite side of a flexible base 24, from the spikes 22 as in FIG. 5.

As noted, the vest 12 can be provided in static form, with spikes 22 and/or bristles 26 permanently engaged to one or more of the central portion 17, side portions 15 and collar portion 18, of the vest 12. Or, the spikes 22 and the bristles 26 and/or other predator dissuading attachments to the vest 12, can be engaged with a separable fastener 28 formed of a first half thereof engaged on the base 24 of the spikes 22 and/or a base 24 having bristles 26 engaged, which is configured for a removable engagement with a second half of the separable fastener 28, attached to an exterior facing surface of the body 13 of the vest 12.

Shown herein for sake of disclosure and understanding, such a separable fastener can be hook and loop fabric, positioned in both the vest 12 and the base 24, used for attaching dissuading components. However, any separable fastener on which half of that fastener may be engaged to the vest 12, and a mating half of the fastener to a base 24 of an attached predator dissuading component, can be employed as one skilled in the art would use, such as clips, snaps, buttons, sewing, zippers, zip ties, or any separable mating fastener as one skilled might find in the GRANGER or another fastener catalog.

The separable mode is preferable in that it allows the user to configure the vest 12 to include bristles 26, spikes 22, light emitting components such as LED's 30, or other predator dissuading components attached to the vest 12 as desired, and allows each user to adapt a respective vest 12 with such attachments in positions and of a type, to dissuade local predators to the animal to which they have engaged the vest in the as-used position.

Additionally, it should be noted that while spikes 22, and bristles 26, and light emitters 20, are shown as a group of different attachments which can be removably engaged to the vest 12, other predator dissuading attachments can be employed and are considered included within the claims of this invention.

Figure 3:
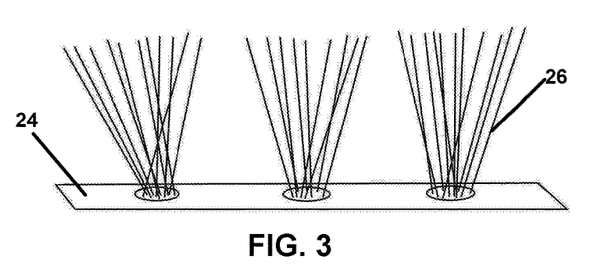
FIG. 3 depicts the bristles in multiple adjacent sections which are engageable to the vest and which project therefrom once engaged to fasteners on the exterior of the vest.
Figure 4:
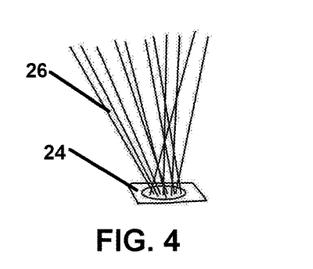
FIG. 4 depicts a smaller configuration of bristles like those of FIG. 3, but which can be positioned by the user to any position on the vest having a cooperative fastener.

FIGS. 3 and 4, shows that the bristles can be engaged to a base 24 in multiple adjacent sections, which are engageable to the vest 12 directly, or can be engaged using separable fasteners between the vest 12 and base 24 thereof. The bristles are preferably formed of flexible material such as a polymeric material such as plastic, nylon, PVC, or similar materials which will bend but return to a linear shape. A first end of the bristles 26 are engaged to either the vest 12 or a base 24 engaged to the vest 12, and the bristles extend to a distal which may be between one half inch to 18 inches or more in length. The base 24 will be generally flexible and planar on the attaching side to the vest 12, but on the opposite side engaging bristles 26 the base 24 might have other shapes adapted to project bristles 26 therefrom in many directions. For example an arched shape will allow bristles to extend from a perceived hump in an arched configuration, or a dome shape of the base 24 would allow extension of the bristles 26 in many different directions away from the vest 12 surface. Further, the bristles 26 can be colonize to allow decoration of the animal, as well as the use of a color which might confuse or otherwise dissuade a predator.

Figure 5:
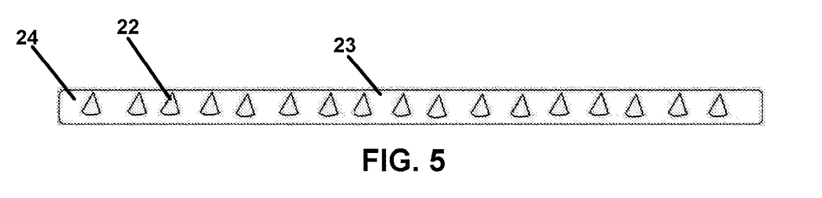
FIG. 5 depicts engageable spikes extending from a base which would be engaged with the vest, or configured with mating fasteners to allow for removable engagement to the vest.

As noted, FIG. 5 depicts engageable spikes 22 extending from a base 24 which would be engaged with the vest 12 directly or can be removably engaged using separable fasteners between the vest 12 and base 24. The spikes 22 may be engaged anywhere on the vest 12 such as the collar portion 18, or areas where half portions of the separable fastener 28 are positioned. The same is true of the light emitters 30 or bristles 26, and it should be noted the separable fastener 28 can also be anywhere on the vest 12 and not just in the preferred positions shown.

Figure 6:
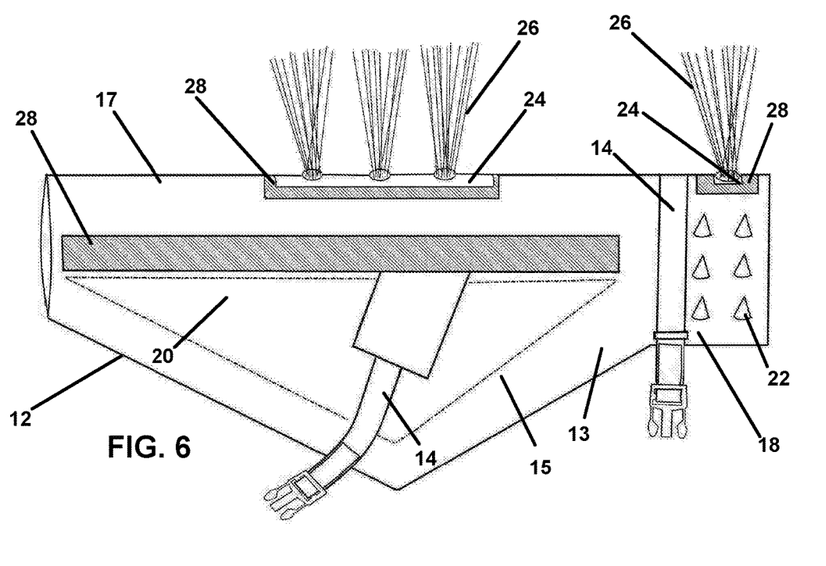
FIG. 6 shows a side view of the vest of the device as it would appear on the side of a pet or animal to which it engages and shows bristles extending along with spikes.

FIG. 6 depicts a side view of the vest 12 of the device 10 as it would appear from a position adjacent an animal with the device 10 secured in the as-used position. As shown, bristles 26 extend from an area which will cover the spine of the animal, and the top of the neck, and spikes 22 are engaged to the collar portion 18. Such has been found to prevent bites by predators along the spine of the animal, or to the neck of the animal wearing the device.

Figure 7:
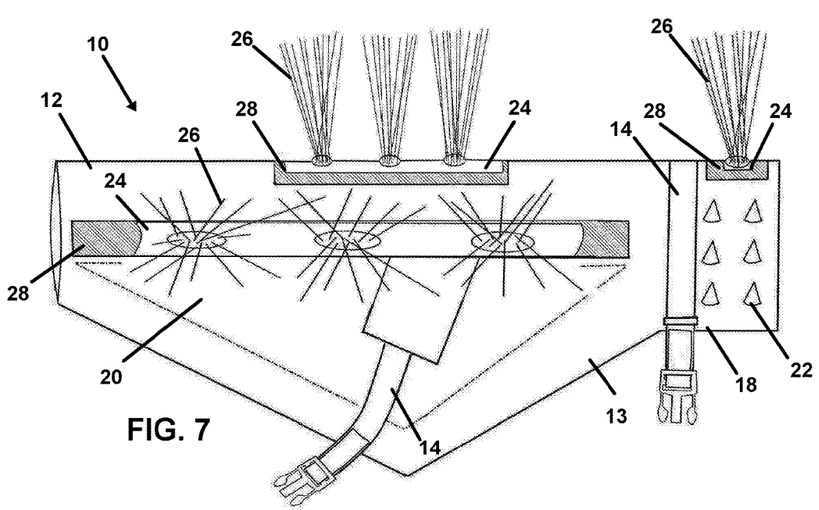
FIG. 7 depicts the device having the vest with bristles extending from top, collar, and side surfaces, and also having spikes projecting from a collar portion.

FIG. 7 shows a mode of the device 10 in a similar view to FIG. 6, and having the vest 12 with bristles 26 extending centrally above the spine of an animal with the device in the as-used position, and at the top of the collar portion 18 and also extending from side surfaces of the vest 12 covering sides of body of the animal wearing it. These bristles 26 as noted make the animal wearing the vest 12 confusing and appear larger to a predator, and projecting from the top and sides will tend to spear or engage the eyes of a predator trying to bight the body or neck of the animal wearing the device.

Figure 8:
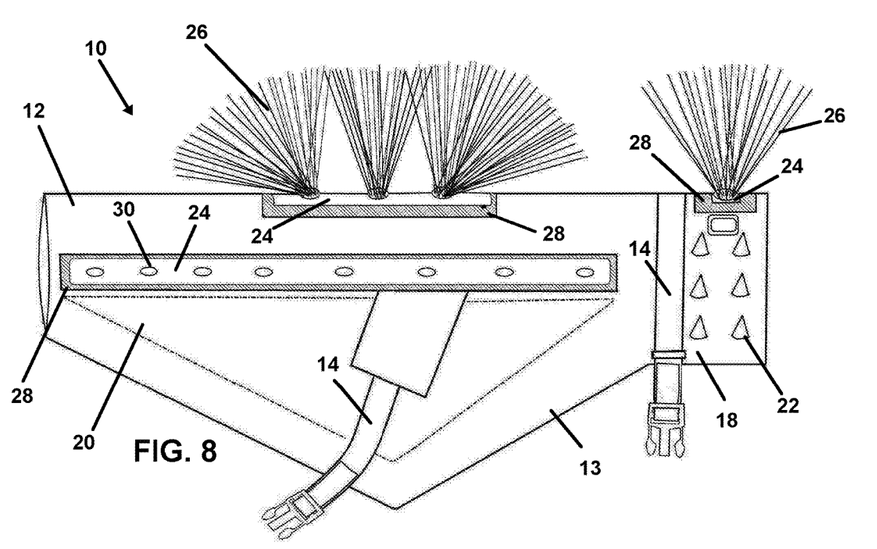
FIG. 8 shows the device having a vest with spikes engaged upon both the collar, and light emitters such as LED's engaged to the sides and which are operatively engaged with a battery to illuminate the sides of the vest.

FIG. 8 shows the device 10 configured similar to FIG. 7, but having spikes engaged upon the top and the collar portion 18 of the body. Also included are light emitters 30 such as LED's engaged to areas of the vest 12 adapted for positioning on the sides of the body of the animal wearing it. A battery (not shown) and wiring and switches would be included and engaged to the base 24 holding the light emitters 30. Emitting light has both the effect of confusing and scaring predators, and allowing the owner of the animal to find it in darkness.

Figures 9, 10:
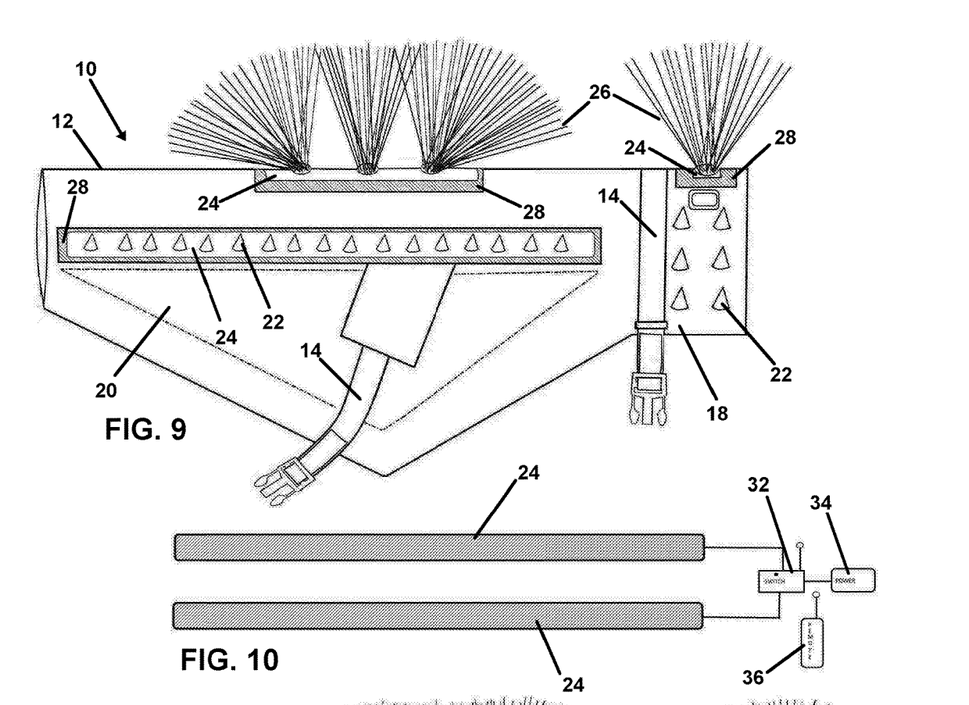
FIG. 9 shows the vest of the device having spikes engaged to the sides as well as projecting from the collar, and additionally having bristles extending from the top or peak and from the collar.
FIG. 10 shows an attachment to the vest of the device configured for delivering a high voltage shock to a predator in contact with the two conductive strips which are operatively engaged to a high voltage power generating component operable using a remote control.

FIG. 9 provides a view of the vest 14 of the device 10 showing that spikes 22 can be engaged to the sides as well as projecting from the collar portion 18, to show as noted that configurations are only limited by the number and type of dissuading attachments available with an attachable base 24, and the positions of the mating separable fasteners 28 on the vest 12.

Figure 11:
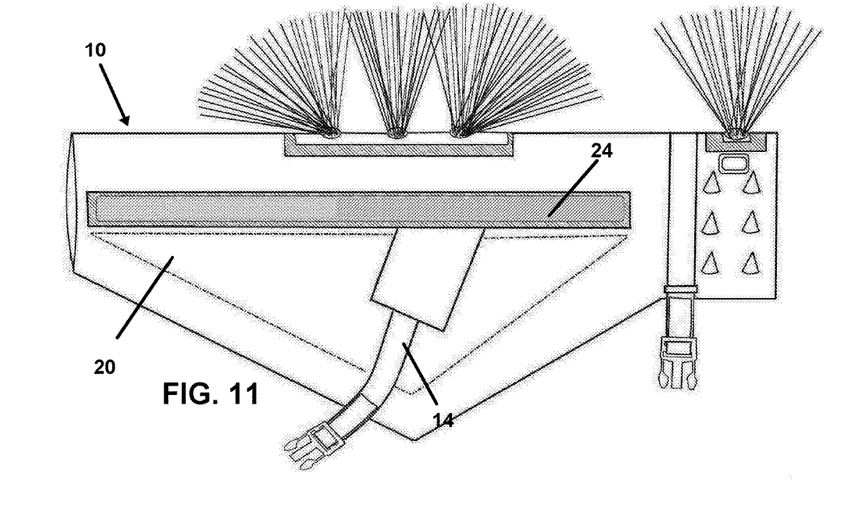
FIG. 11 shows the conductive strips engaged to one side with the opposite side similarly engaged and both operatively engaged with the high voltage generating component, and showing bristles and spikes also extending from the best.

Shown mounted in FIG. 11, FIG. 10 shows an attachment to the vest 12 of the device 10 configured with a electric conductor shown as a conductive base 24 formed of electrically conductive material, and an operatively connected to a switch 32 which may be activated to communicate one pole or one half of a high voltage electric power supply, to each of said conductive base 24 portions. In one mode, the switch 32 can be wirelessly activated by a remote control 36 to connect power from the onboard power supply such as a battery 34.

The conductive base 24 may be engaged to the vest 12 using separable fasteners 28, in positions thereon adapted to engage in the mouth of a predator biting the vest 12 on an animal. As shown, in one preferred mode, a wireless control 36 is employable to activate the combination switch 32 and an electric shock generating component 33 to thereby deliver one half of a high voltage electric current circuit, to each side of the conductive base 24 from an onboard electric power source 34 such as a battery or capacitor. The mouth of the predator biting the pet or dog over their back, will complete the circuit, and deliver a high voltage shock from the electric shock generator 33 to the predator thereby encouraging release.

The high voltage can be generated by a stun gun type electric shock generator 33 engaged to or within the housing for the switch 32, or might be provided by a higher voltage battery 34 or capacitor 34, engaged to the conductive bases 24 through the switch 32.

As noted, FIG. 11 shows the conductive base 24 engaged to one side of the worn vest 12, and the second conductive base 24 would be similarly engaged on the opposite side, close enough to the central portion covering the spine of an animal, to allow contact with both strips in a bite by a predator over the spine and back. The conductive base 24 portions may be employed in combination with the attachment of spikes 22 or bristles 26 or other attached components, such that even if a predator is not dissuaded by contact with spikes 22 or bristles 26, they will receive an electric shock. This may entail forming the base 24 engaged with spikes 22 or bristles 26 or other dissuading projections, from conductive material.

The conductive base 24 strips as noted, each may be connected by switch 32 activation with one pole from an high voltage electric shock generator 33 which may be positioned in the housing for the switch 32. Each of the conducting base 24 sections would be connected to one pole or half of the high voltage electric circuit, such that the mouth of a predator contacting both portions of the conductive base 24 will complete the circuit and deliver a high voltage shock.

Figure 12:
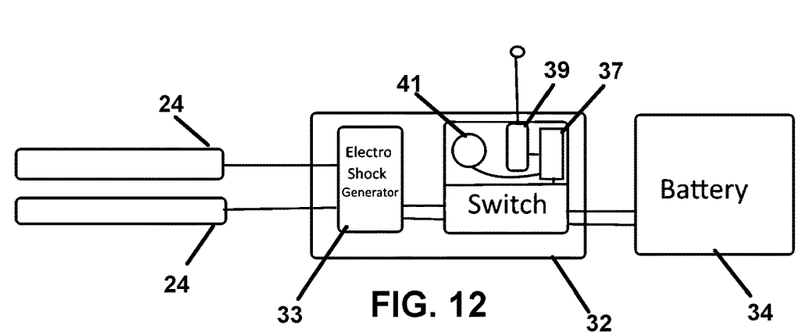
FIG. 12 depicts components employable with the vest device herein to deliver a high voltage shock to an attacking predator.

As noted earlier, other means for activating the switch 32 to connect one half of a high voltage circuit, to each of the two conducting base 24 portions may be employed. Such may be for example, proximity switching activated by software running on a computing component 37 or computer, operatively engaged to close the switch 32. In this mode the switch 32 employing a connected transceiver 39 will transmit an RF signal for receipt by the remote control 36, and a return signal will be sent by the remote control 36 which must be received by the transceiver 39 and communicated to the computing component 37 operating the switch 32. If the pet or dog as strayed to a proximity outside a distance where the RF signals travel, subsequent to a sent signal from the transceiver 37, which is not answered by the remote control 36, software running on the computing component 37 adapted to monitor such, will close the switch 32 and thus arm the conductive base 24 components. If the pet or dog locates to a position sufficiently proximate to the remote control 36 to receive an answer to a sent signal subsequently, the computing component 37 will open the switch 32 and disarm the conductive base components 24. Such will protect the pet or animal wearing the vest should they panic or just run away from their owner.

Finally, as also noted earlier, other means to automatically activate the switch 32 to connect the conductive base 24 components to the electric shock generator 33 can be employed, which will automatically protect a pet or animal wearing the vest should the owner or caretaker not be proximate. Such for example may be a microphone 41 connected to the computing component or microprocessor operatively engaged to open and close the switch 32. Should the microphone 41 communicate an electronic signal representative of a preprogrammed sound designated in software running on the computing component 37, that elicits a response to activate the switch 32, software running on the computing component 37 will signal the switch 32 to close thereby connect the conductive base 24 portions, to the energized electric shock generator 33. Such a sound for example could be a growling noise, or could be a recorded sound of panic or stress the pet or animal wearing the device makes when faced with a predator.

While all of the fundamental characteristics and features of the predator dissuading vest for pets and animals have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A predator dissuading vest, comprising:
a vest having a central portion extending between a first end and second end, and having two side portions on opposing sides of said central portion;
said vest having an interior surface opposite an exterior surface;
said vest configured for positioning on a body of animal to an as-used position, with said interior surface of said vest contacting against said body of said animal and with said central portion adjacent the spine of said animal and said side portions adjacent sides of said body of said animal;
a collar portion extending from said first end of said first end of said vest;
said collar portion configured to substantially encircle a neck of said animal with said vest in said as-used position;
a plurality of spikes, each of said plurality of spikes extending from a first end in a connection with said exterior surface of said vest, to distal ends spaced a distance from said exterior surface;
said distal ends of said spikes having a shape adapted to induce pain or injury to a portion of a body of a predator making contact with said distal ends;
said plurality of spikes being located on said collar portion thereof; and
whereby said spikes extending from said exterior surface of said vest provide a means to dissuade predators from attacking said animal wearing said vest in said as-used position by first inducing pain or injury to said predators.

2. The predator dissuading vest of claim 1, additionally comprising:
said vest including pierce-resistant fabric therein, said pierce resistant fabric adapted to prevent piercing of said vest by teeth of said predator;
said plurality of said spikes in said connection with said exterior surface of said vest additionally including said shape of said distal end being pointed and said spikes being located along said central portion thereof.

3. The predator dissuading vest of claim 2, additionally comprising:
said plurality of said spikes in said connection with said exterior surface of said vest, additionally including said spikes being located on said exterior surface along both of said two side portions thereof.

4. The predator dissuading vest of claim 3 wherein said additional plurality of said spikes in said connection with said vest along both of said two side portions comprise, one plurality of said spikes extending in a line of sequentially positioned spikes on said exterior surface of a first of said two side portions, and a second plurality of said spikes extending in a line of sequentially positioned spikes on said exterior surface of a second of said two side portions.

5. The predator dissuading vest of claim 3 wherein said spikes in said engagement with said vest along both of said two side portions thereof, are in a removable engagement therewith.

6. The predator dissuading vest of claim 3 wherein said plurality of said spikes in said connection with said exterior surface of said vest located along said central portion thereof, are in a removable engagement therewith.

7. The predator dissuading vest of claim 4 wherein said one plurality of said spikes extending in said line of sequentially positioned spikes on said exterior surface of a first of said two side portions is in a removable engagement therewith, and said second plurality of said spikes extending in said line of sequentially positioned spikes on said exterior surface of a second of said two side portions is in a removable engagement therewith.

8. The predator dissuading vest of claim 7 wherein said removable engagement of said line of sequentially positioned spikes on said first of said two side portions is formed by a separable fastener having a first half thereof connected to said first end of said spikes and having a second half thereof engaged on said exterior surface of said vest on said first of said two side portions; and
said removable engagement of said line of sequentially positioned spikes on said second of said two side portions is formed by a separable fastener having a first half thereof connected to said first end of said spikes and having a second half thereof engaged on said exterior surface of said vest on said second of said two sides.

9. The predator dissuading vest of claim 5 additionally comprising:
bristles, said bristles also being removably engageable to said exterior surface of said vest along said central portion.

10. The predator dissuading vest of claim 2 wherein said plurality of said spikes in said connection with said vest along said central portion of said exterior surface thereof, extend in a line of sequentially positioned said spikes extending from said exterior surface of said central portion.

11. The predator dissuading vest of claim 10 wherein said spikes located along said central portion thereof are in a removable engagement with said central portion.

12. The predator dissuading vest of claim 10 wherein said plurality of said spikes in said connection with said exterior surface of said vest located along said central portion thereof, are in a removable engagement therewith.

13. The predator dissuading vest of claim 2 wherein said spikes located along said central portion thereof are in a removable engagement with said central portion.

14. The predator dissuading vest of claim 2 wherein said plurality of said spikes in said connection with said exterior surface of said vest located along said central portion thereof, are in a removable engagement therewith.

15. The predator dissuading vest of claim 14 additionally comprising:
bristles, said bristles also being removably engageable to said exterior surface of said vest along said central portion.

16. The predator dissuading vest of claim 1, additionally comprising:
said plurality of said spikes in said connection with said exterior surface of said vest, additionally including said spikes being located along and extending from said exterior surface of said vest on both of said two side portions thereof.

17. The predator dissuading vest of claim 16 wherein said additional plurality of said spikes in said connection with said vest along both of said two side portions comprise, one plurality of said spikes extending in a line of sequentially positioned spikes on said exterior surface of a first of said two side portions, and a second plurality of said spikes extending in a line of sequentially positioned spikes on said exterior surface of a second of said two side portions.

18. The predator dissuading vest of claim 16 wherein said spikes in said engagement with said vest along both of said two side portions thereof, are in a removable engagement therewith.

19. The predator dissuading vest of claim 17 wherein said one plurality of said spikes extending in said line of sequentially positioned spikes on said exterior surface of a first of said two side portions is in a removable engagement therewith, and said second plurality of said spikes extending in said line of sequentially positioned spikes on said exterior surface of a second of said two side portions is in a removable engagement therewith.

20. The predator dissuading vest of claim 19 wherein said removable engagement of said line of sequentially positioned spikes on said first of said two side portions is formed by a separable fastener having a first half thereof connected to said first end of said spikes and having a second half thereof engaged on said exterior surface of said vest on said first of said two side portions; and
said removable engagement of said line of sequentially positioned spikes on said second of said two side portions is formed by a separable fastener having a first half thereof connected to said first end of said spikes and having a second half thereof engaged on said exterior surface of said vest on said second of said two sides.

* * * * *